(12) United States Patent
Jenoski et al.

(10) Patent No.: US 11,768,135 B2
(45) Date of Patent: Sep. 26, 2023

(54) WASTE EVACUATION APPARATUS FOR AN AUTOMATED SPECIMEN PREPARATION SYSTEM

(71) Applicant: HOLOGIC, INC., Marlborough, MA (US)

(72) Inventors: Raymond Jenoski, Boylston, MA (US); Eric Grimes, Hopedale, MA (US)

(73) Assignee: Hologic, Inc., Marlborough, MA (US)

( * ) Notice: Subject to any disclaimer, the term of this patent is extended or adjusted under 35 U.S.C. 154(b) by 749 days.

(21) Appl. No.: 16/644,490

(22) PCT Filed: Aug. 29, 2018

(86) PCT No.: PCT/US2018/048495
§ 371 (c)(1),
(2) Date: Mar. 4, 2020

(87) PCT Pub. No.: WO2019/050734
PCT Pub. Date: Mar. 14, 2019

(65) Prior Publication Data
US 2020/0284701 A1    Sep. 10, 2020

Related U.S. Application Data

(60) Provisional application No. 62/554,458, filed on Sep. 5, 2017.

(51) Int. Cl.
*G01N 1/28* (2006.01)
(52) U.S. Cl.
CPC ......... *G01N 1/2813* (2013.01); *G01N 1/2806* (2013.01); *G01N 2001/2846* (2013.01)
(58) Field of Classification Search
CPC .............. G01N 1/2813; G01N 1/4005; G01N 2001/4088; G01N 1/2806
See application file for complete search history.

(56) References Cited

U.S. PATENT DOCUMENTS

2003/0077838 A1   4/2003  Pressman et al.
2004/0105784 A1   6/2004  Fukuju et al.
(Continued)

FOREIGN PATENT DOCUMENTS

CN      1806165       7/2006
CN     201787991      4/2011
(Continued)

OTHER PUBLICATIONS

CN201787991, English translation from Espacenet (Year: 2011).*
PCT International Preliminary Report on Patentability (Chapter I of the Patent Cooperation Treaty) for PCT/US2018/048495, Applicant: Hologic Inc., Form PCT/IB/326 and 373, dated Mar. 19, 2020 (13 pages
(Continued)

*Primary Examiner* — David W Berke-Schlessel
*Assistant Examiner* — Trent R Clarke
(74) *Attorney, Agent, or Firm* — Vista IP Law Group, LLP (57) ABSTRACT

An automated specimen preparation system for preparing a specimen from a sample in a sample container is provided. The automated specimen preparation system comprises a specimen transfer device configured for holding a specimen collector thereon and for being positioned within the sample container. The specimen transfer device comprises a central bore having an open distal end and a closed proximal end, a pressure monitoring port fluidly coupled to the central bore at the proximal end of the central bore, and a fluid waste evacuation port fluidly coupled to the proximal end of the central bore. The pressure monitoring port comprises a reduced diameter portion coupled directly to the central bore. The automated specimen preparation system further comprises a vacuum source fluidly coupled to the fluid waste evacuation port, and a pressure monitoring device fluidly coupled to the pressure monitoring port.

20 Claims, 7 Drawing Sheets

(56) References Cited

U.S. PATENT DOCUMENTS

| | | | |
|---|---|---|---|
| 2007/0125170 A1 | 6/2007 | Tenney | |
| 2007/0148041 A1 | 6/2007 | Hunt et al. | |
| 2011/0062087 A1 | 3/2011 | Kaufman et al. | |
| 2019/0017906 A1* | 1/2019 | Hunt | B01L 7/00 |

FOREIGN PATENT DOCUMENTS

| | | |
|---|---|---|
| CN | 202255952 | 5/2012 |
| CN | 203898324 | 10/2014 |
| CN | 204050458 | 12/2014 |
| CN | 104520717 | 4/2015 |
| EP | 0383459 A2 | 8/1990 |
| EP | 0802413 A2 | 10/1997 |
| JP | H08-62210 A | 3/1996 |

OTHER PUBLICATIONS

). PCT International Search Report for PCT/US2018/048495, Applicant: Hologic, Inc. Form PCT/ISA/210 and 220, dated Jan. 23, 2019 (5 pages).
PCT Written Opinion of the International Search Authority for PCT/US2018/048495, Applicant: Hologic, Inc., Form PCT/ISA/237, dated Jan. 23, 2019 (11 pages).
Foreign OA for CN Patent Appln. No. 2018800574888 dated Dec. 30, 2021 (with English translation).
Foreign Search Report for CN Patent Appln. No. 2018800574888 dated Dec. 21, 2021 (with English translation).
Foreign Exam Report for CA Patent Appln. No. 3073743 dated May 19, 2023.

* cited by examiner

WASTE EVACUATION APPARATUS FOR AN AUTOMATED SPECIMEN PREPARATION SYSTEM

RELATED APPLICATIONS DATA

The present application is a National Phase entry under 35 U.S.C § 371 of International Patent Application No. PCT/US2018/048495, having an international filing date of Aug. 29, 2018, which claims the benefit under 35 U.S.C. § 119 to U.S. Provisional patent application Ser. No. 62/554,458, filed Sep. 5, 2017, which is incorporated by reference in its entirety into the present application.

FIELD OF THE INVENTION

The present invention generally relates to preparation of cytological specimens, and more particularly, to systems and methods for automatically preparing a cytological specimen by collecting a cytological specimen from a sample container and dispensing the specimen onto an analytical element.

BACKGROUND

Cytology is a branch of biology dealing with the study of the formation, structure, and function of cells. As applied in a laboratory setting, cytologists, cytotechnologists, and other medical professionals make medical diagnoses of a patient's condition based on visual examination of a specimen of the patient's cells. A typical cytological technique is a "pap smear" test, in which cells are scraped from a woman's cervix and analyzed in order to detect the presence of abnormal cells, a precursor to the onset of cervical cancer. Cytological techniques are also used to detect abnormal cells and disease in other parts of the human body.

Cytological techniques are widely employed, because collection of cell specimens for analysis is generally less invasive than traditional surgical pathological procedures such as biopsies, whereby a tissue specimen is excised from the patient using specialized biopsy needles having spring loaded translatable stylets, fixed cannulae, and the like. Cell samples may be obtained from the patient by a variety of techniques including, for example, by scraping or swabbing an area, or by using a needle to aspirate body fluids from the chest cavity, bladder, spinal canal, or other appropriate area. The cell samples are placed in solution and subsequently collected and transferred to a glass slide for viewing under magnification. Fixative and staining solutions may be applied to the cells on the glass slide for preserving the specimen for archival purposes and for facilitating examination.

It is generally desirable that the cells on the slide have a proper spatial distribution, so that individual cells can be examined. A single layer of cells is typically preferred. Accordingly, preparing a specimen from a fluid sample containing many cells typically requires that the cells first be separated from each other by mechanical dispersion, fluidic shear, or other techniques so that a thin, monolayer of cells can be collected and deposited on the slide. In this manner, the cytotechnologist can more readily discern abnormal cells. The cells are also able to be counted to ensure that an adequate number of cells have been evaluated.

Certain methods and apparatus for generating a thin monolayer of cells on a slide advantageous for visual examination are disclosed in U.S. Pat. No. 5,143,627 issued to Lapidus et al. and entitled "Method and Apparatus for Preparing Cells for Examination;" U.S. Pat. No. 5,240,606 issued to Lapidus et al. and entitled "Apparatus for Preparing Cells for Examination;" U.S. Pat. No. 5,269,918 issued to Lapidus et al. and entitled "Clinical Cartridge Apparatus;" and U.S. Pat. No. 5,282,978 issued to Polk, Jr. et al. and entitled "Specimen Processor Method and Apparatus," all of which are assigned to the assignee of the present invention and all of the disclosures of which are incorporated herein by reference in their entirety.

According to a specimen preparation process disclosed in these patents, a patient's cells in a preservative fluid in a sample container are dispersed using a spinning specimen collector disposed therein. A controlled vacuum is applied to the specimen collector to draw the fluid through a screen filter thereof until a desired quantity and spatial distribution of cells is collected against the filter. Thereafter, the specimen collector is removed from the sample container and the filter portion impressed against a glass slide while positive pressure is applied to transfer the collected cells to the slide in substantially the same spatial distribution as collected. The pressure during the specimen preparation process may be monitored to ensure that it is effectively performed.

While apparatus manufactured according to the teachings of one or more of these patents have been commercially successful, such as the Thin Prep® 2000 System manufactured and sold by Cytyc Corporation located in Boxborough, Mass., such apparatus may not completely evacuate waste fluid during specimen preparation. Fluid build-up during specimen preparation may cause errors in pressure monitoring, and problems with cell transfer and spot quality.

Thus, there is a need for an automated specimen preparation system that completely and efficiently evacuates waste fluid.

SUMMARY

In accordance with a first aspect of the present invention, an automated specimen preparation system for preparing a specimen (e.g., a cytological specimen) from a sample (e.g., a cytological sample) in a sample container is provided. The automated specimen preparation system comprises a specimen transfer device configured for holding a specimen collector thereon and for being positioned within the sample container. The specimen collector may have a hollow cylindrical body and a membrane having pores of a selected size to capture desired particles for the specimen and to pass smaller particles and fluids. In this case, the specimen transfer device may receive the hollow cylindrical body of the disposable specimen collector.

The specimen transfer device comprises a central bore having an open distal end and a closed proximal end, a pressure monitoring port fluidly coupled to the central bore at the proximal end of the central bore, and a fluid waste evacuation port fluidly coupled to the proximal end of the central bore. The pressure monitoring port comprises a reduced diameter portion coupled directly to the central bore. The reduced diameter portion may be configured for preventing liquid from entering the pressure monitoring port from the central bore. For example, the reduced diameter portion may have a diameter between 0.04 and 0.08 inches. The waste fluid evacuation port may have a bottom wall that is contiguous with a bottom wall of the central bore.

The automated specimen preparation system further comprises a vacuum source fluidly coupled to the fluid waste evacuation port, and a pressure monitoring device fluidly coupled to the pressure monitoring port. The automated specimen preparation system may optionally comprise a source of positive pressure fluidly coupled to the pressure monitoring port. In one embodiment, the automated specimen preparation system further comprises a rotating tool head on which the specimen transfer device is mounted. The rotating tool head is rotatable about an axis of rotation in a first angular position to locate the specimen collector within the sample container. The automated specimen preparation system may further comprise an analytical element, in which case, the rotatable tool head may be rotatable about the axis of rotation in a second angular position to locate the specimen collector to transfer the specimen to the analytic element.

In accordance with a second aspect of the present inventions, a specimen transfer device for use with a system for preparing a specimen from a sample in a sample container is provided. The specimen transfer device comprises a cylindrical member, a central bore within the cylindrical member having an open distal end and a closed proximal end, and a pressure monitoring port fluidly coupled to the central bore at the proximal end of the central bore. The pressure monitoring port comprises a reduced diameter portion coupled directly to the central bore. The reduced diameter portion may be configured for preventing liquid from entering the pressure monitoring port from the central bore. For example, the reduced diameter portion may have a diameter between 0.04 and 0.08 inches. The specimen transfer device further comprises a fluid waste evacuation port fluidly coupled to the proximal end of the central bore. In on embodiment, the waste fluid evacuation port has a bottom wall that is contiguous with a bottom wall of the central bore.

In accordance with a third aspect of the present invention, a method of preparing a specimen (e.g., a cytological specimen) from a sample (e.g., a cytological sample) in a sample container is provided. The method uses a system comprises a specimen transfer device holding a specimen collector thereon. The specimen transfer device comprising a central bore having an open distal end and a closed proximal end, a pressure monitoring port fluidly coupled to the central bore at the proximal end of the central bore, and a fluid waste evacuation port fluidly coupled to the proximal end of the central bore. The pressure monitoring port comprises a reduced diameter portion coupled directly to the central bore. The reduced diameter portion may have a diameter between 0.04 and 0.08 inches, and the waste fluid evacuation port may have a bottom wall that is contiguous with a bottom wall of the central bore.

The method comprises positioning the specimen collector in the sample container, collecting a specimen from the sample container with the specimen collector, preventing or minimizing waste liquid from entering the pressure monitoring port by virtue of the reduced diameter portion, detecting the pressure within the central bore via the pressure monitoring port while the specimen is collected from the sample container, repositioning the specimen collector to contact an analytical element, transferring the specimen to the analytical element, and evacuating waste liquid from the central bore via the fluid waste evacuation port. The method may optionally comprise applying positive pressure to the pressure monitoring port to evacuate liquid from the pressure monitoring port. In one embodiment, the method comprises rotating the specimen collector about an axis of rotation in a first angular position to position the specimen collector in the sample container, and rotating the specimen collector about the axis of rotation in a second angular position to reposition the specimen collector in contact with the analytical element.

Other and further aspects and features of embodiments of the disclosed inventions will become apparent from the ensuing detailed description in view of the accompanying figures.

BRIEF DESCRIPTION OF THE DRAWINGS

Other and further aspects and features of embodiments of the disclosed inventions will become apparent from the ensuing detailed description in view of the accompanying figures.

The drawings illustrate the design and utility of preferred embodiments of the present invention, in which similar elements are referred to by common reference numerals. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention, which is defined only by the appended claims and their equivalents. In addition, an illustrated embodiment of the disclosed inventions needs not have all the aspects or advantages shown. An aspect or an advantage described in conjunction with a particular embodiment of the disclosed inventions is not necessarily limited to that embodiment and can be practiced in any other embodiments even if not so illustrated. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

DETAILED DESCRIPTION

Other and further aspects and features of embodiments of the disclosed inventions will become apparent from the ensuing detailed description in view of the accompanying figures.

Figure 1:
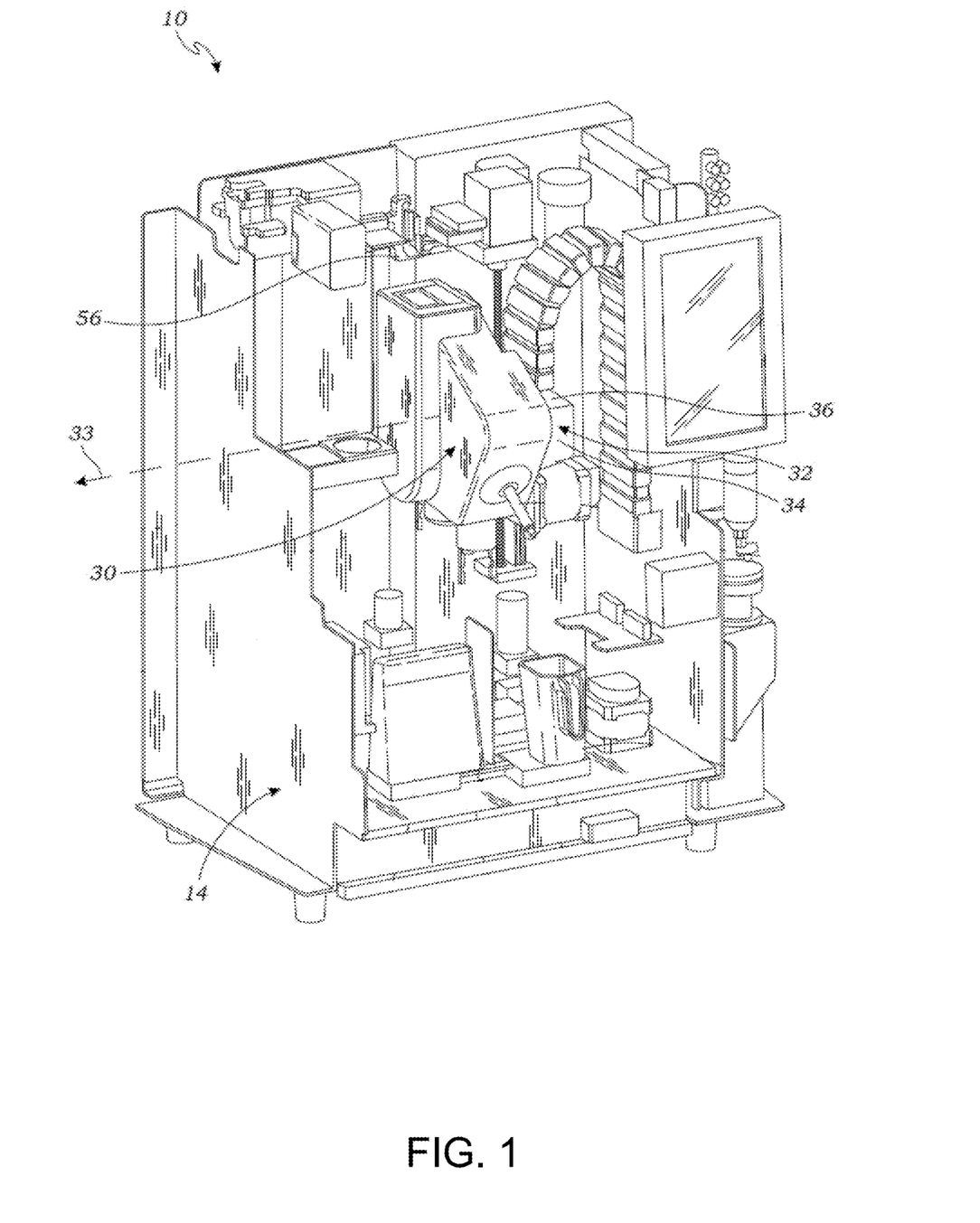
FIG. 1 is a front perspective view of an automated specimen preparation system constructed in accordance with one embodiment of the present invention.
Figure 2:
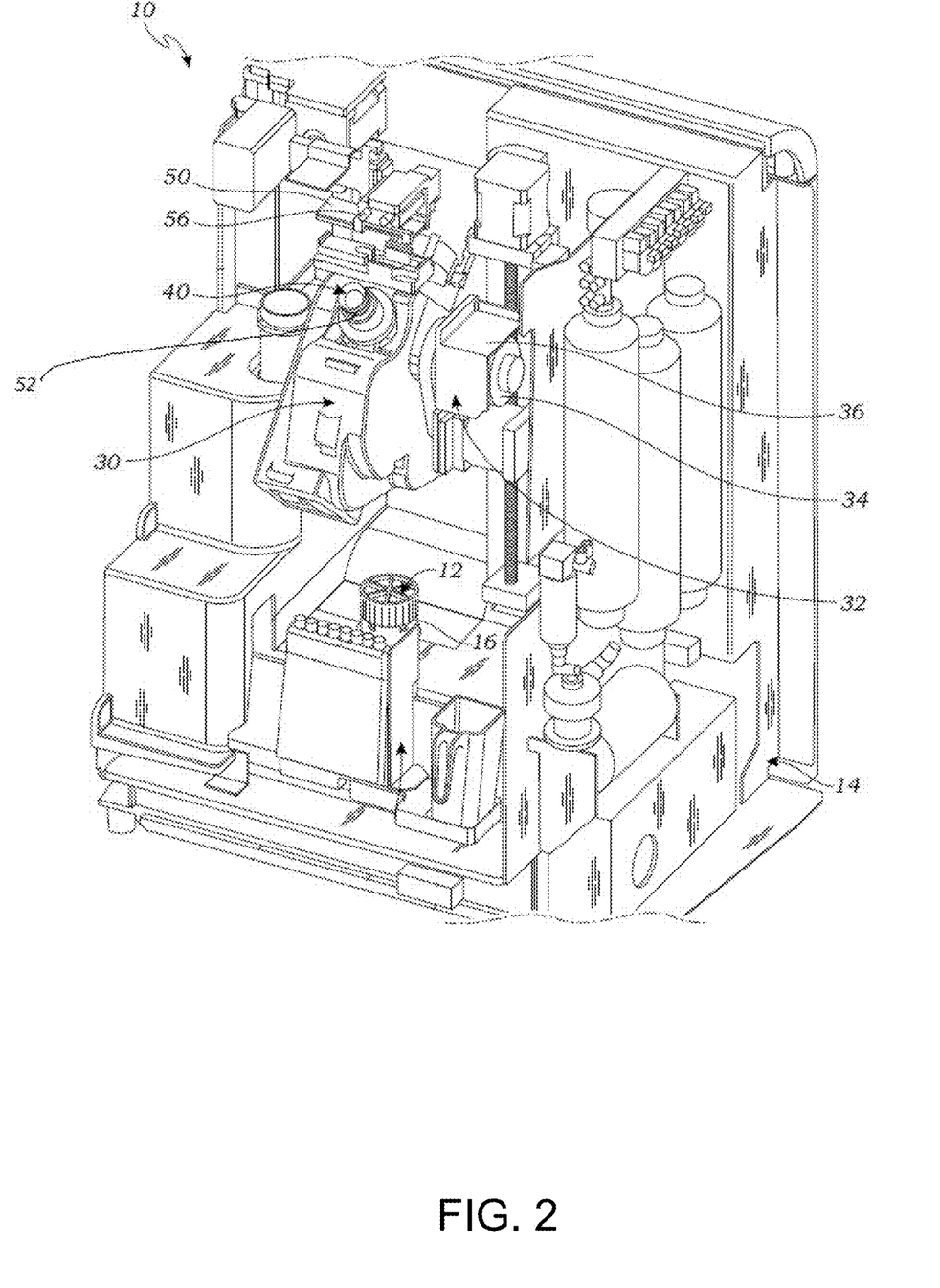
FIG. 2 is another front perspective view of the automated specimen preparation system of FIG. 1.

With reference to FIGS. 1 and 2, an automated specimen preparation system 10 constructed in accordance with one embodiment of the present invention will be discussed.

The system 10 comprises sample container holder 16 (shown in FIG. 2), which includes a cylindrical receptacle or recess for seating or receiving a cylindrical sample container 12. The sample container holder 16 may be any suitable shape for receiving the particular sample container 12 being utilized with the system 12, such as cylindrical, rectangular box, or other shape.

The system 10 further comprises a rotating tool head 30 and a tool head actuator 32 on which the rotating tool head 30 is mounted. The tool head 30 is rotatable about an axis of rotation 33 which in this described embodiment is a lateral horizontal axis (y-axis, in the orientation shown in FIG. 1). The tool head actuator 32 has a rotational actuator 34 coupled to the tool head 30, which drives and controls the rotational motion of the tool head 30. The tool head actuator 32 also has a linear actuator 36 to which the rotational actuator 34 is mounted. The linear actuator 36 moves the tool head actuator 32 and tool head 30 vertically up and down to control the vertical position of the tool head 32. The linear actuator 36 is mounted to a back wall of a chassis 14 upon which the system is mounted.

The system 10 comprises a number of tools that are disposed on the tool head 30 for manipulating a sample and various consumables used by the system 10 in preparing a specimen and/or an aliquot sample. Each of these tools is located on the tool head 30 at a different angular position about the axis of rotation 33, and thus, rotates and moves with the tool head 30 as the tool head 30 is rotated about the axis of rotation 33 by the tool head actuator 32. Thus, the actuation of the tool head 30 positions each of these tools in a location to perform their respective functions, as described herein.

One of these tools is a specimen transfer device 40 (shown in FIG. 2), which is configured to prepare a cytological specimen (e.g., a microscope slide having a specimen of the sample applied to it) which can be used for cytological analysis, such as pathology. The specimen transfer device 40 collects a specimen from the sample in the sample container 12 and transfers the collected specimen to an analytical element 50 (e.g., a slide). In this described embodiment, the specimen transfer device 40 includes a cylindrical member 52 which extends radially outward from the tool head 30. The cylindrical member 52 is configured to receive a disposable specimen collector 54 (shown in FIGS. 3 and 4) which slides onto the cylindrical member 52.

The specimen collector 54 includes a hollow cylindrical body having an open proximal end and a membrane spanning across its distal end. The membrane may be a screen filter or other suitable membrane having pores of a selected size to capture desired particles for the specimen and to pass smaller particles and fluids. When installed on the cylindrical member 52, the specimen collector 54 extends beyond the end of the cylindrical member 52 a sufficient distance to allow the specimen collector 54 to be inserted into the sample within the sample container 12 to collect a specimen on the membrane of the specimen collector 54 without contacting the cylindrical member 52 (or any part of the specimen transfer device 40) to the sample, such that only the only the specimen collector 54 contacts the sample. This ensures that the specimen transfer device 40 is not contaminated by the sample material when it collects a specimen from the sample container 12. Once the specimen transfer device 40 has collected a specimen onto the specimen collector 54, it is then manipulated to transfer the specimen from the specimen collector 54 to the analytical element 50, as described in more detail below.

Figure 3:
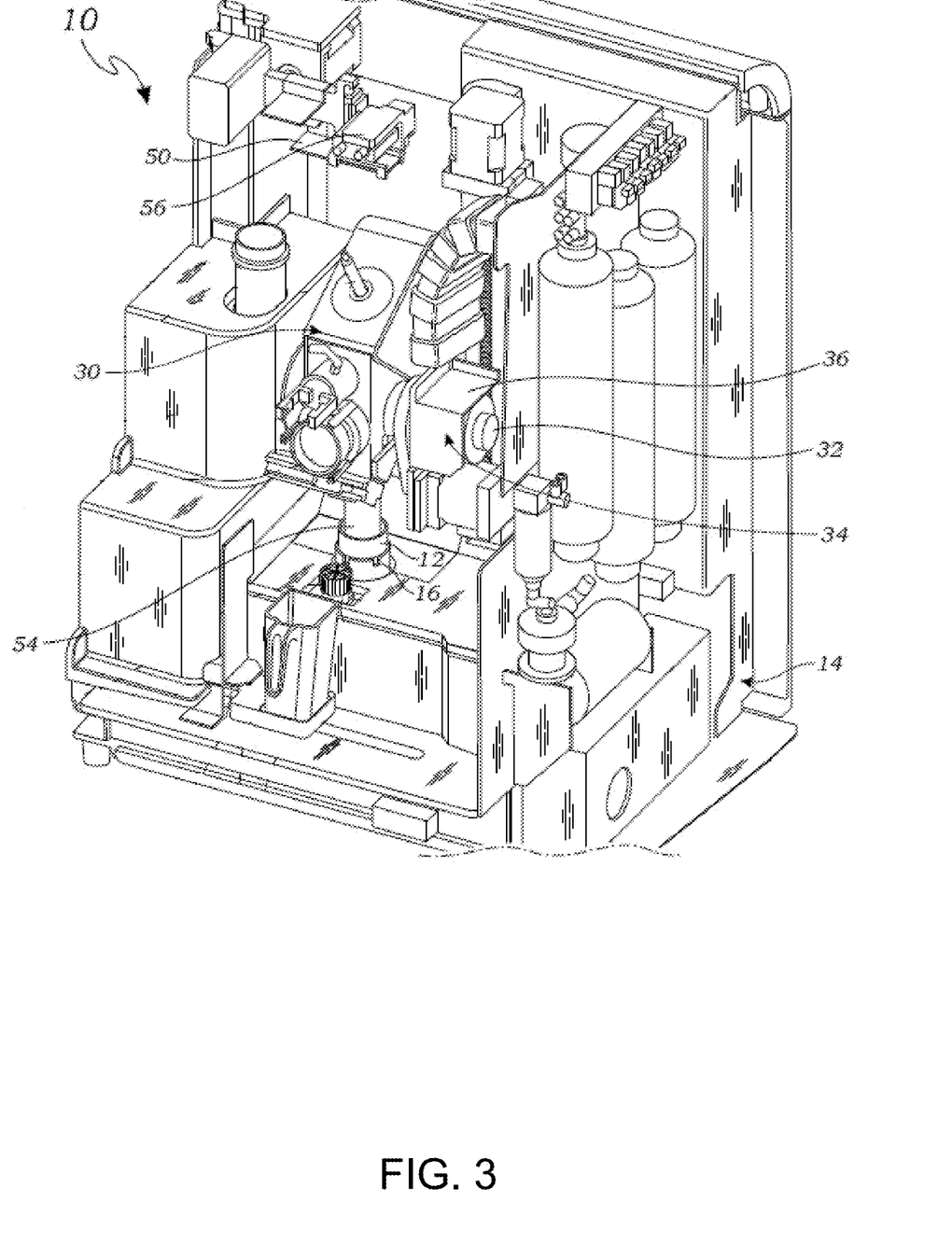
FIG. 3 is a front perspective view of the automated specimen preparation system of FIG. 1, particularly illustrating a specimen transfer device of the automated specimen preparation system rotated in a specimen collecting position.
Figure 4:
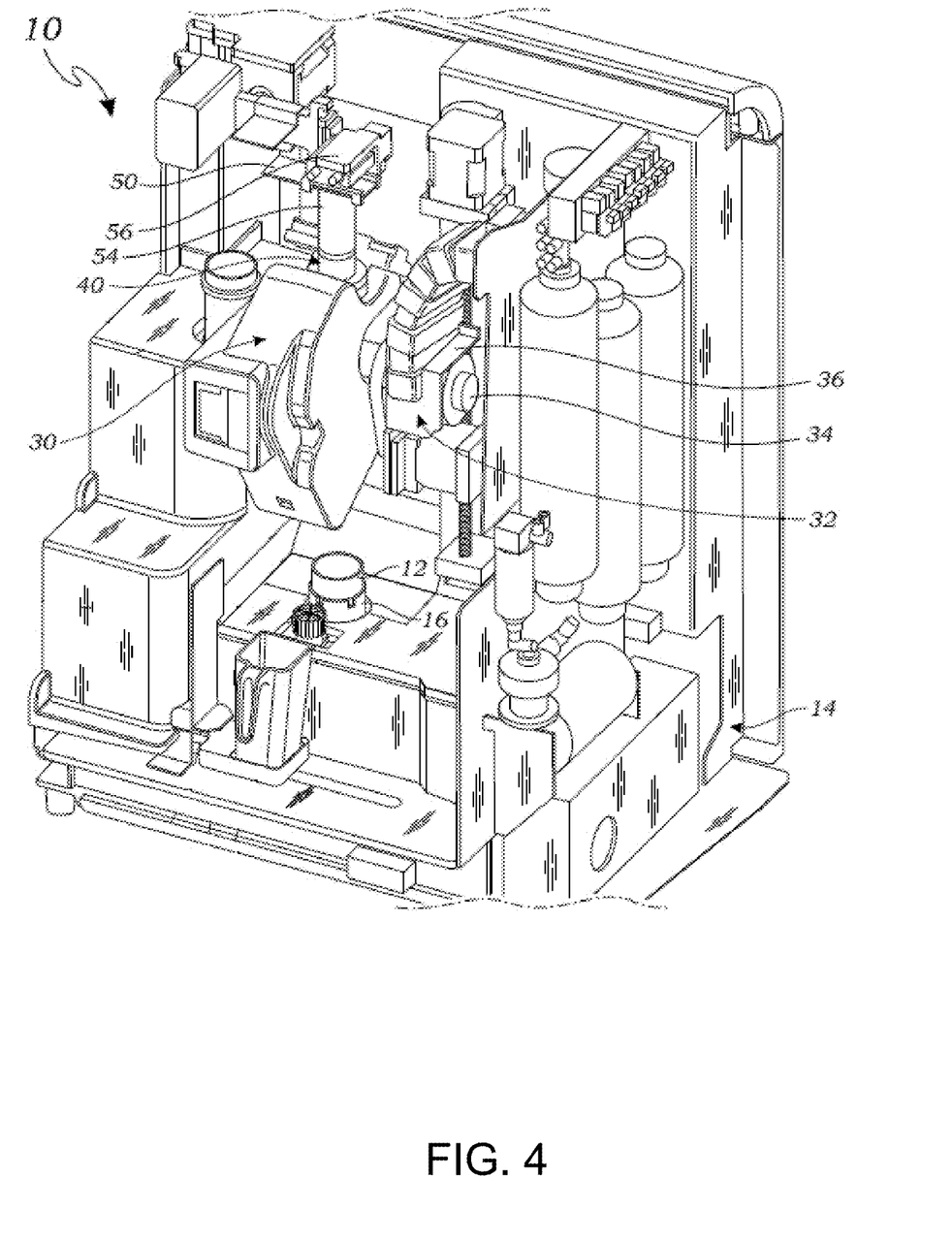
FIG. 4 is a front perspective view of the automated specimen preparation system of FIG. 1, particularly illustrating the specimen transfer device rotated in a specimen transferring position.

The tool head 30 may be rotated about the axis of rotation 33 in a first angular position to locate the specimen collector 54 within the sample container 12 (FIG. 3) and a second angular position to transfer the specimen from the specimen collector 54 to the analytical element 50 (FIG. 4).

In particular, as shown in FIG. 3, the tool head 30 is rotated and translated to position the specimen collector 54 on the specimen transfer device 40 in position to collect a specimen from the sample container 12 onto the membrane of the specimen collector 54. The specimen transfer device 40 is operated to collect a specimen onto the membrane of the specimen collector 54 by forcing the sample back and forth through the membrane either by a cycling vacuum and/or by moving the specimen collector 54 up and down, such as by moving the tool head 30 via the tool head actuator 32. This process allows a thin layer or single layer of particles, such as cells, to be collected on the membrane of the specimen collector 54.

As shown in FIG. 4, the tool head 30 is rotated and translated to position the specimen collector 54 on the specimen transfer device 40 in position to transfer the specimen on the membrane to the analytical element 50. The specimen transfer device 40 and/or an analytical element positioner 56 are then manipulated to contact the membrane having the specimen thereon onto the analytical element 50. The tool head 30 may be moved via the tool head actuator 32 to manipulate the specimen transfer device 40.

Further details describing the automated specimen preparation system 10 are set forth in U.S. patent application Ser. No. ______, which is expressly incorporated herein by reference in its entirety.

During the above described specimen preparation process, the specimen transfer device 40 rotates from a specimen collecting position (shown in FIG. 3) to a specimen transferring position (shown in FIG. 4). Due to gravity, waste fluid may become trapped in the specimen transfer device 40 during this rotation.

Figure 5:
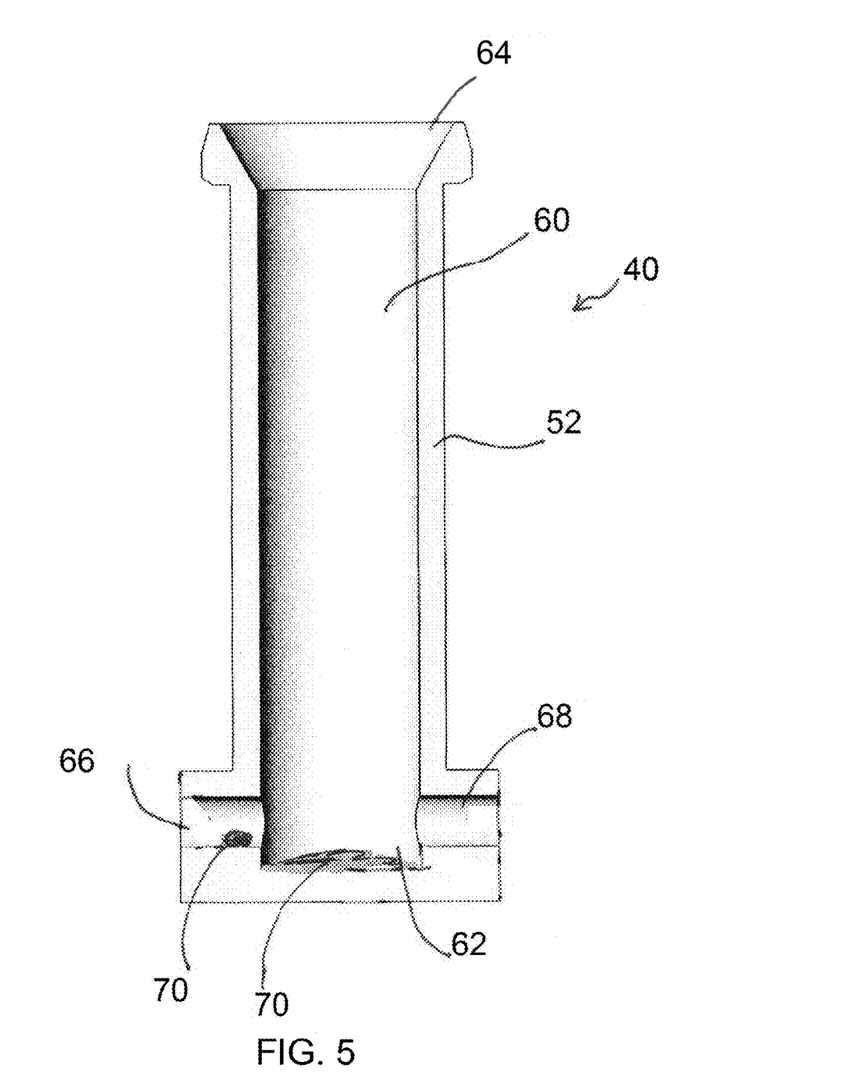
FIG. 5 shows a cross-sectional view of one typical embodiment of a specimen transfer device for use in the automated specimen preparation system of FIG. 1.

For example, with reference to FIG. 5, a typical arrangement for the specimen transfer device 40 comprises cylindrical member 52, a central bore 60 extending from a proximal closed end 62 to a distal opening 64 of the specimen transfer device 40. The cylindrical member 52 is configured for holding the specimen collector 54 (described above) thereon. Prior to specimen collection, the disposable specimen collector 54 is slid onto the distal end of the cylindrical member 52.

The specimen transfer device 40 further comprises a pressure monitoring port 66, which is fluidly coupled between the central bore 60 at the proximal closed end 62 of the specimen transfer device 40 and a pressure monitor (not shown) for monitoring the pressure in the central bore 60. As there shown, the pressure monitoring port 66 has a constant diameter along its length. The specimen transfer device 40 further comprises a waste fluid evacuation port 68, which is fluidly coupled between the central bore 60 at the proximal closed end 62 of the specimen transfer device 40 and a source of vacuum (not shown) for waste fluid evacuation. The waste fluid evacuation port 68 is positioned slightly distal to the proximal end 62 of the specimen transfer device 40.

Most waste fluid is evacuated through the evacuation port 68 during specimen collection. However, when the specimen transfer device 40 is rotated from the specimen collection position (shown in FIG. 3) to the specimen transfer position (shown in FIG. 4), gravity may cause waste fluid 70 to collect in the closed proximal end 62 of the specimen transfer device 40 and in the pressure monitoring port 66. As discussed in the background, fluid in the pressure monitoring port 66 may cause errors in pressure monitoring, and fluid buildup in the closed proximal end 62 of the specimen transfer device 40 may cause problems with cell transfer and spot quality.

Figure 6:
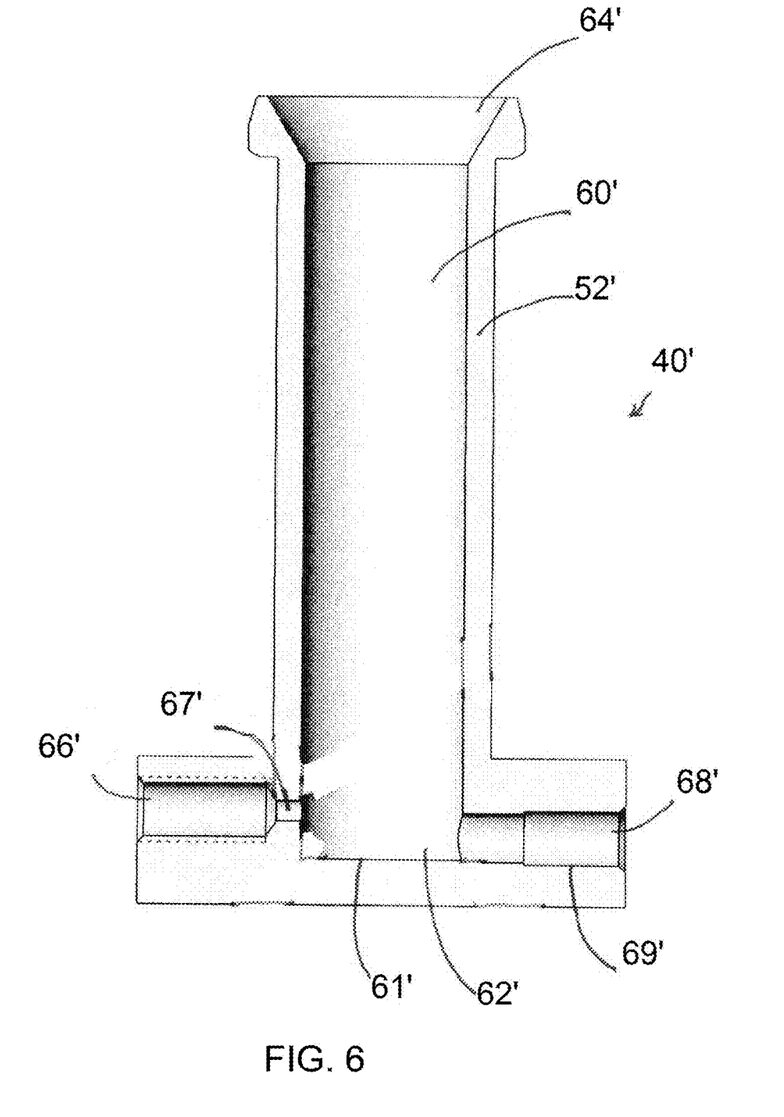
FIG. 6 shows a cross-sectional view of an improved embodiment of a specimen transfer device for use in the automated specimen preparation system of FIG. 1.

Referring now to FIG. 6, an improved specimen transfer device 40' is similar to the specimen transfer device 40 shown in FIG. 5 in that it comprises a central bore 60' that extends from a proximal closed end 62' to a distal opening 64' of the specimen transfer device 40', and further comprises a pressure monitoring port 66', which is fluidly coupled between the central bore 60' at the proximal closed end 62' of the specimen transfer device 40' and a pressure monitor (not shown) for monitoring the pressure in the central bore 60', and a waste fluid evacuation port 68', which is fluidly coupled between the central bore 60' at the closed proximal end 62' of the specimen transfer device 40' and a source of vacuum (not shown) for waste fluid evacuation. The specimen transfer device 40' shown in FIG. 6 has the same outer dimensions and shape as the specimen transfer device 40 shown in FIG. 5. As such, the specimen transfer device 40' can easily be used in place of the specimen transfer device 40.

The specimen transfer device 40' shown in FIG. 6 differs from the specimen transfer device 40 shown in FIG. 5 in that the pressure monitoring port 66' has a reduced inner diameter portion 67'. In other words, the portion of the pressure monitoring port 66' that is in directly fluid communication with the central bore 60' has a reduced inner diameter. The inner diameter of the reduced inner diameter portion 67' may be small enough to prevent fluid from entering the pressure monitoring port 66' due to surface tension of fluid molecules. For example, the reduced inner diameter portion 67' may be 0.04-0.08 inches in diameter, and may preferably be 0.06 inches in diameter. Further, positive pressure may be applied through the pressure monitoring port 66' via a source of positive pressure (not shown) in order to evacuate any fluid waste that may enter the pressure monitoring port 66'. In order to minimize or prevent waste fluid from pooling in the closed proximal end 62' of the central bore 60', the waste fluid evacuation port 68' may be positioned as low as possible. As shown in FIG. 6, the bottom wall 69' of the waste fluid evacuation port 68' is contiguous with the bottom wall 61' of the central bore 60'. Thus, it can be appreciated that the specimen transfer device 40' shown in FIG. 6 is more efficient at evacuating waste fluid compared to the specimen transfer device 40 shown in FIG. 5.

Figure 7:
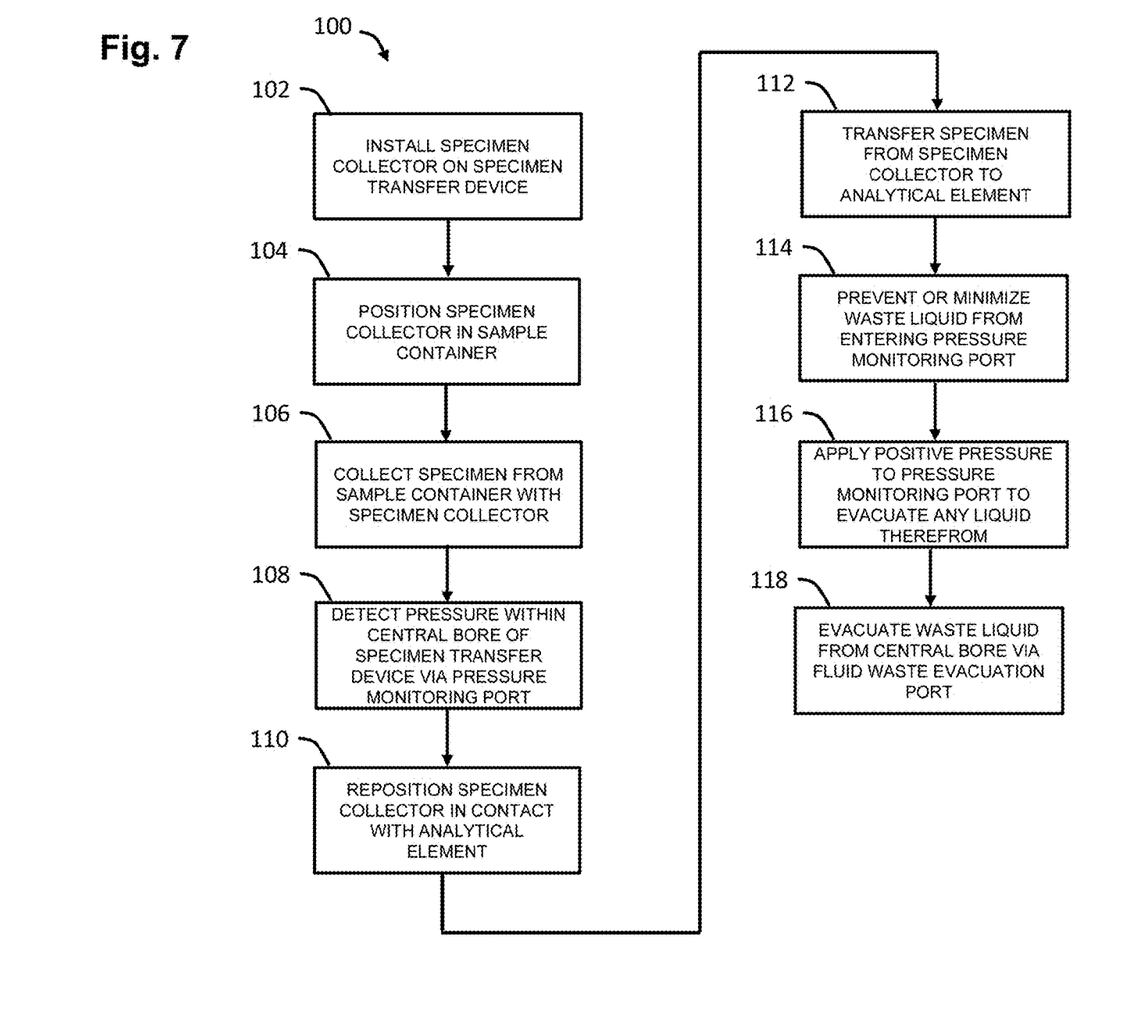
FIG. 7 is a flow diagram illustrating one method of using the automated specimen preparation system to prepare a specimen from a sample.

Having described the structure, arrangement, and function of the automated specimen preparation system 10, one method 100 of operating the automated specimen preparation system 10 to prepare a specimen from a cytological sample contained in a sample container 12 will now be described with reference to FIG. 7.

First, the specimen collector 54 is installed on the specimen transfer device 40' (step 102), and the specimen collector 54 is rotated about the axis of rotation 33 in the first angular position (specimen collecting position) to position the specimen collector 54 in the sample container 12 (step 104). Next, a specimen is collected from the sample container 12 with the specimen collector 54 (step 106). In this particular embodiment, this is accomplished by cycling vacuum through the central bore 60' of the specimen transfer device 40' to collect the specimen on the membrane of the specimen collector 54. Pressure is detected within the central bore 60' of the specimen transfer device 40' via the pressure monitoring port 66' while the specimen is collected from the sample container 12 (step 108). Next, the specimen collector 54 is rotated about the axis of rotation 33 in the second angular position (specimen transferring position) to reposition the specimen collector 54 in contact with the analytical element 50 (step 110), and the specimen is transferred from the specimen collector 54 to the analytical element 50 (step 112). Waste liquid is prevented or minimized from entering the pressure monitoring port 66' by virtue of the reduced diameter portion 67' of the pressure monitoring port 66' (step 114). Optionally, positive pressure can be applied to the pressure monitoring port 66' to evacuate any liquid therefrom (step 116). Any waste liquid is then evacuated from the central bore 60' of the specimen transfer device 40' via the fluid waste evacuation port 69' (step 118).

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. While the systems and methods have been described cytological samples, they can be configured and utilized with any types of samples.

Furthermore, it is understood that the methods of the present invention do not require all of the steps of the method, but may include any combination of sub-processes of the overall method. Moreover, the methods of the present invention do not require the steps be performed in any particular order, unless logic or the description explicitly requires the steps to be performed in a particular order. For example, describing that a step or steps occurs before or after another step or steps does not explicitly require such order, but only describes the order for clarity and convenience of the description.

Accordingly, embodiments are intended to exemplify alternatives, modifications, and equivalents that may fall within the scope of the claims. The invention, therefore, should not be limited, except to the following claims, and their equivalents.

The invention claimed is:

1. An automated specimen preparation system for preparing a specimen from a sample in a sample container, the system comprising:
   a specimen transfer device configured for holding a specimen collector thereon and for being positioned within the sample container, wherein the specimen transfer device comprises a central bore having an open distal end and a closed proximal end, a pressure monitoring port fluidly coupled to the central bore at the proximal end of the central bore, and a fluid waste evacuation port fluidly coupled to the proximal end of the central bore, wherein the pressure monitoring port comprises a reduced diameter portion coupled directly to the central bore;
   a vacuum source fluidly coupled to the fluid waste evacuation port; and
   a pressure monitoring device fluidly coupled to the pressure monitoring port.

2. The system of claim 1, wherein the reduced diameter portion is configured for preventing liquid from entering the pressure monitoring port from the central bore.

3. The system of claim 1, wherein the reduced diameter portion has a diameter between 0.04 and 0.08 inches.

4. The system of claim 1, wherein the waste fluid evacuation port has a bottom wall that is contiguous with a bottom wall of the central bore.

5. The system of claim 1, further comprising a source of positive pressure fluidly coupled to the pressure monitoring port.

6. The system of claim 1, wherein the specimen is a cytological specimen, and the sample is a cytological sample.

7. The system of claim 1, further comprising the specimen collector, wherein the specimen collector has a hollow cylindrical body and a membrane having pores of a selected size to capture desired particles for the specimen and to pass smaller particles and fluids, the specimen transfer device receiving the hollow cylindrical body of the specimen collector.

8. The system of claim 7, further comprising a rotating tool head on which the specimen transfer device is mounted, the rotating tool head being rotatable about an axis of rotation in a first angular position to locate the specimen collector within the sample container.

9. The system of claim 8, further comprising an analytical element, the rotatable tool head being rotatable about the axis of rotation in a second angular position to locate the specimen collector to transfer the specimen to the analytic element.

10. A specimen transfer device for use with a system for preparing a specimen from a sample in a sample container, the specimen transfer device, comprising:
   a cylindrical member;
   a central bore within the cylindrical member having an open distal end and a closed proximal end;
   a pressure monitoring port fluidly coupled to the central bore at the proximal end of the central bore, wherein the pressure monitoring port comprises a reduced diameter portion coupled directly to the central bore; and
   a fluid waste evacuation port fluidly coupled to the proximal end of the central bore.

11. The specimen transfer device of claim 10, wherein the reduced diameter portion is configured for preventing liquid from entering the pressure monitoring port from the central bore.

12. The specimen transfer device of claim 10, wherein the reduced diameter portion has a diameter between 0.04 and 0.08 inches.

13. The specimen transfer device of claim 10, wherein the waste fluid evacuation port has a bottom wall that is contiguous with a bottom wall of the central bore.

14. A method of preparing a specimen from a sample in a sample container using the system of claim 1, the method comprising:
   positioning the specimen collector in the sample container;
   collecting a specimen from the sample container with the specimen collector;
   preventing or minimizing waste liquid from entering the pressure monitoring port by virtue of the reduced diameter portion;
   detecting a pressure within the central bore via the pressure monitoring port while the specimen is collected from the sample container;
   repositioning the specimen collector to contact an analytical element;
   transferring the specimen to the analytical element; and
   evacuating waste liquid from the central bore via the fluid waste evacuation port.

15. The method of claim 14, wherein the reduced diameter portion has a diameter between 0.04 and 0.08 inches.

16. The method of claim 14, wherein the waste fluid evacuation port has a bottom wall that is contiguous with a bottom wall of the central bore.

17. The method of claim 14, further comprising applying positive pressure to the pressure monitoring port to evacuate liquid from the pressure monitoring port.

18. The method of claim 14, wherein the specimen is a cytological specimen, and the sample is a cytological sample.

19. The method of claim 14, further comprising rotating the specimen collector about an axis of rotation in a first angular position to position the specimen collector in the sample container.

20. The method of claim 19, further comprising rotating the specimen collector about the axis of rotation in a second angular position to reposition the specimen collector in contact with the analytical element.

\* \* \* \* \*